(12) United States Patent
Gonzalez Loyo

(10) Patent No.: US 8,577,730 B2
(45) Date of Patent: Nov. 5, 2013

(54) CASH MANAGEMENT OPTIMIZATION FOR PAYMENT PROCESSING

(75) Inventor: German Efrain Gonzalez Loyo, Weston, FL (US)

(73) Assignee: CenPos, Inc., Miami, FL (US)

( * ) Notice: Subject to any disclaimer, the term of this patent is extended or adjusted under 35 U.S.C. 154(b) by 372 days.

(21) Appl. No.: 12/634,445

(22) Filed: Dec. 9, 2009

(65) Prior Publication Data

US 2011/0106638 A1 May 5, 2011

Related U.S. Application Data

(63) Continuation of application No. 12/608,794, filed on Oct. 29, 2009, now abandoned.

(51) Int. Cl.
*G06Q 20/00* (2012.01)

(52) U.S. Cl.
USPC ............ 705/17; 705/21; 705/34; 705/75; 705/77; 235/379; 235/380

(58) Field of Classification Search
USPC .............. 705/17, 21, 34–44, 14.43, 75, 77; 235/379–380
See application file for complete search history.

(56) References Cited

U.S. PATENT DOCUMENTS

| | | | | |
|---|---|---|---|---|
| 6,691,915 B1 * | 2/2004 | Thaxton et al. | | 235/380 |
| 7,318,049 B2 * | 1/2008 | Iannacci | | 705/39 |
| 7,624,068 B1 * | 11/2009 | Heasley et al. | | 705/38 |
| 7,707,089 B1 * | 4/2010 | Barton et al. | | 705/35 |
| 7,848,978 B2 * | 12/2010 | Imrey et al. | | 705/35 |
| 7,873,573 B2 * | 1/2011 | Realini | | 705/39 |
| 7,890,422 B1 * | 2/2011 | Hirka et al. | | 705/39 |
| 8,078,531 B2 * | 12/2011 | McElroy et al. | | 705/39 |
| 8,200,527 B1 * | 6/2012 | Thompson et al. | | 705/7.39 |
| 2004/0230539 A1 * | 11/2004 | Praisner | | 705/74 |
| 2006/0157553 A1 * | 7/2006 | Kelley et al. | | 235/380 |
| 2010/0299195 A1 * | 11/2010 | Nix et al. | | 705/14.17 |
| 2012/0005090 A1 * | 1/2012 | Pitroda et al. | | 705/39 |

\* cited by examiner

*Primary Examiner* — Vanel Frenel

(74) *Attorney, Agent, or Firm* — Albert Bordas, P.A.

(57) ABSTRACT

Embodiments of the present invention provide a method, system and computer program product for cash management optimization method for payment processing. In an embodiment of the invention, a cash management optimization method for payment processing can include receiving a transaction profile for a proposed transaction as payment for a purchase by a purchaser from a merchant at a card processing terminal configured to identify a card number for a card. The method further can include comparing the transaction profile to merchant-specified preferences mapping different transaction profiles to different payment processors. A payment processor for the proposed transaction can be selected based upon the comparison of the transaction profile to the merchant-specified preferences. Thereafter, the proposed transaction can be routed over a computer communications network to the selected payment processor for payment processing.

15 Claims, 4 Drawing Sheets

CASH MANAGEMENT OPTIMIZATION FOR PAYMENT PROCESSING

CROSS-REFERENCE TO RELATED APPLICATIONS

This application is a Continuation under 35 U.S.C. §120 of U.S. patent application Ser. No. 12/608,794, filed Oct. 29, 2009, entitled "PAYMENT PROCESSING SYSTEM, METHOD AND COMPUTER PROGRAM PRODUCT," the entire teachings of which are incorporated herein by reference.

BACKGROUND OF THE INVENTION

1. Field of the Invention

The present invention relates to the field of payment processing and more particularly to debit card and credit card processing of retail transactions.

2. Description of the Related Art

For centuries, the retail sale of goods and services has permitted not just payment in hard currency, but also payment by way of a promise to provide hard currency. Raw forms of credit result from a mere promise—an account or "tab". Modern sophisticated forms of credit include credit accounts, such as those represented by a credit card. More recent advancements in payments systems include the notion of a debit account or debit account. Even more recent advancements in payment systems process gift cards and other accounts of stored value. Each of credit cards, debit cards and gift cards require the coordination of an intermediary merchant account in which credit and debit card payments can be accepted by a merchant, and a payment processing service managing the settlement of each transaction.

Conventional credit card transactions are sent electronically to merchant processing banks for authorization, capture and deposit. Various methods exist for presenting a credit card sale to the payment processor for processing. In all circumstances the account number is read by "swiping" a magnetic strip of a credit or debit card through a credit card terminal/reader, by communicating with a computer chip embedded in a credit or debit card, or by manual methods including providing the number manually through a Web site or interactive voice response system.

Most payment transactions conducted in the world of brick and mortar sales utilize a credit card terminal. Generally, a credit card terminal is a dedicated piece of equipment often linked to a point of sale (POS) system. When a credit card or debit card is processed through the terminal, either through swiping or manual keying, the terminal establishes a communicative connection with a specified payment processing system to verify the credit card and authorize the transaction. The transaction then can be stored in the terminal until a "polling window" opens. At that point, stored transactions can be uploaded resulting in the transfer of funds directly to a specified merchant bank.

The use of a merchant account in payment processing is not with cost—literally. Specifically, the use of a merchant account can result in the occurrence of a variety of fees, some periodic, and others charged on a per-item or percentage basis. Some fees are determined by the provider of the merchant account. Other fees are passed through the merchant account provider to the credit card issuing bank according to a schedule of rates called interchange fees. Interchange fees generally vary depending on card type and the circumstances of the transaction. For example, if a transaction originates by swiping a card through a credit card terminal the fee will be different than would be the case if the account information had been provided manually. In many cases, fees are established in order to minimize fraud.

At present, credit and debit card processing services deliver a generic offering to merchants. The generic offering includes a pricing scheme generally known as the "merchant discount rate". Credit and debit card processors typically base the merchant discount rate upon the interchange rate, which is the base rate published by the card associations including Mastercard™ (Mastercard is a registered trademark of Mastercard International Incorporated of Purchase, N.Y.) and Visa™ (Visa is a registered trademark of Visa Inc. of San Francisco, Calif.). The card associations base the interchange rates upon a variety of parameters including the type of card being used (regular, gold, loyalty, corporate, domestic, international, amongst others) in addition to the category into which the merchant belongs. Additionally, credit transactions are priced different from debit card transactions, and debit cards include two different categories: PIN or signature based.

BRIEF SUMMARY OF THE INVENTION

Embodiments of the present invention address deficiencies of the art in respect to payment processing and provide a novel and non-obvious method, system and computer program product for cash management optimization method for payment processing. In an embodiment of the invention, a cash management optimization method for payment processing can include receiving a transaction profile for a proposed transaction as payment for a purchase by a purchaser from a merchant at a card processing terminal configured to identify a card number for a card. The method further can include comparing the transaction profile to merchant-specified preferences mapping different transaction profiles to different payment processors. A payment processor for the proposed transaction can be selected based upon the comparison of the transaction profile to the merchant-specified preferences. Thereafter, the proposed transaction can be routed over a computer communications network to the selected payment processor for payment processing.

In one aspect of the embodiment, the transaction profile can include a determination of whether the card is a debit card or a credit card and the different payment processors are mapped in the merchant-specified preferences to debit cards and credit cards, respectively. In another aspect of the embodiment, the transaction profile can include a determination of whether the purchaser is an in-store customer or an online customer and the different payment processors are mapped in the merchant-specified preferences to in-store customers and online customers, respectively. In yet another aspect of the embodiment, the transaction profile can include a determination of a merchant identification amongst multiple different merchant identifications for correspondingly different portions of a retail location of the merchant and the different payment processors are mapped in the merchant-specified preferences to the different merchant identifications, respectively.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide transaction optimization for payment processing. In accordance with an embodiment of the invention, payment in satisfaction of a purchase from a merchant by a purchaser can be processed through the coordinate use of a card processing terminal and a credit card, debit card or other stored value card. A card association for a swiped card in the card processing terminal can be determined and criteria requisite to a lowest rate charged by the card association can be loaded. As well, optimization criteria pre-specified preferentially by the merchant can be loaded. The card association criteria and the optimization criteria can be mapped to required data for a transaction and the merchant can be prompted to provided the required data through the card processing terminal or a computer display coupled to the card processing terminal. Only once the required data is provided, the processing of a transaction on the swiped card can proceed.

Thereafter, a BIN can be determined for the swiped card as can a transaction profile such as the type of merchandise or service purchased, an identity of the purchaser, an invoice number, an amount of the transaction, or the zip code of the purchaser to name only a few possibilities. Using the transaction profile, the card association, the optimization criteria and the BIN, a particular bank can be selected to process the transaction. Subsequently, the transaction can be assembled to include not only the card number of the swiped card, but the required data also. Finally, the assembled transaction can be transmitted to the selected bank. Optionally, prior to assembling the transaction, but subsequent to obtaining a signature from the purchaser at the card processing terminal, a display of a coupon can be provided in the card processing terminal. At the option of the purchaser, the coupon can be redeemed through a selection in the card processing terminal and the transaction when assembled can account for the redemption of the coupon.

Figure 1:
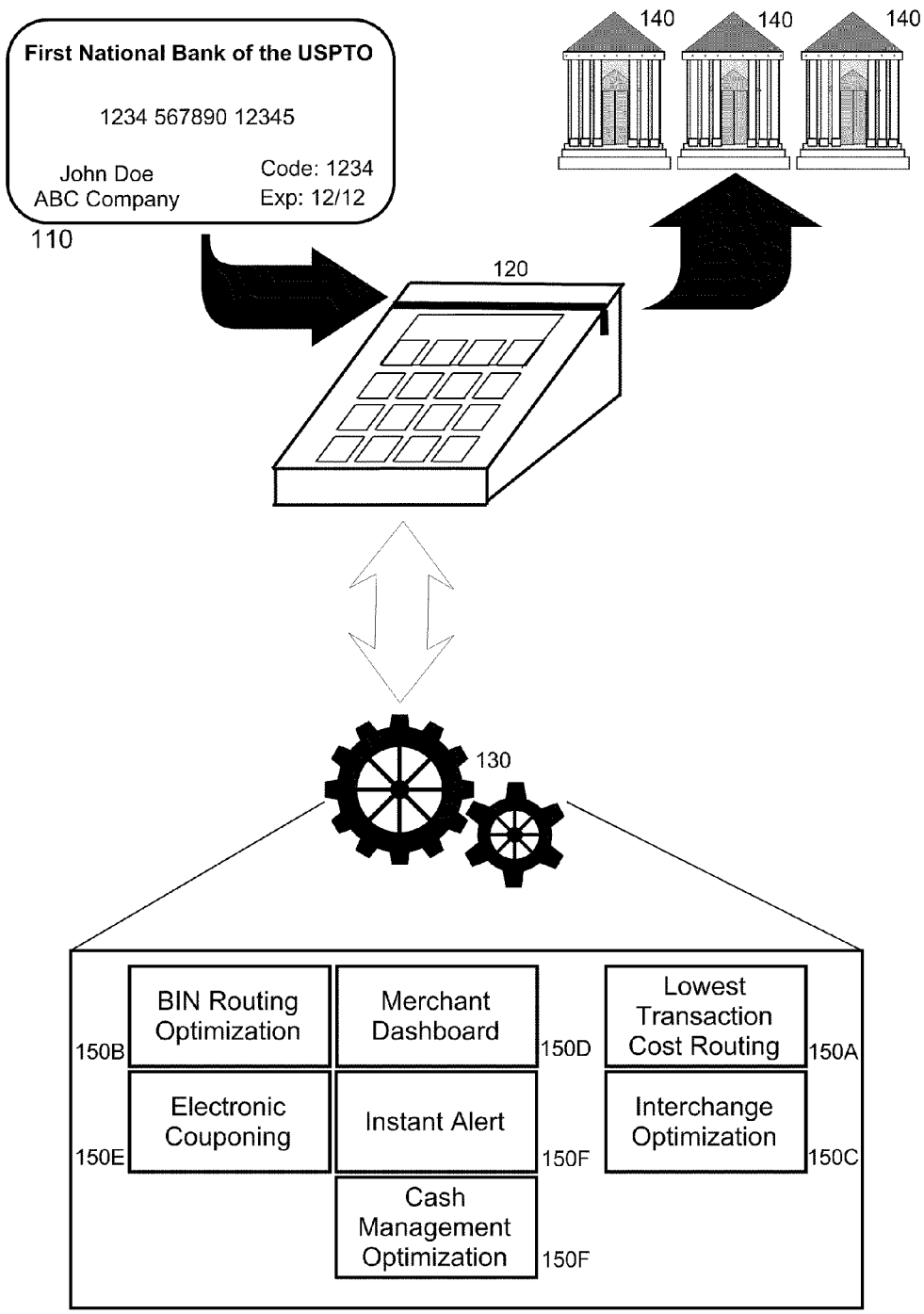
FIG. 1 is a pictorial illustration of an transaction optimization process for payment processing.

In further illustration, FIG. 1 is a pictorial illustration of a process for transaction optimization during payment processing. As shown in FIG. 1, a card 110, such as a debit card, credit card or stored value card can be swiped through a card processing terminal 120 as satisfaction of payment for goods or services provided by a merchant to a purchaser. Transaction optimization system 130 can process payment with the card 110 in order to optimize an interchange rate paid by the merchant in consequence of the payment while meeting preferential criteria for processing payment established by the merchant.

In this regard, data required to be provided by the merchant to a selected bank 140 as part of the transaction in order to achieve a minimized fee payable by the merchant in consequence of the transaction can be determined in advance of sending the transaction to the selected bank 140. Thereafter, the merchant can be compelled to collect the required data for use in assembling the transaction for transmission to the selected bank 140. Of note, selected bank 140 can be selected in accordance with BIN routing rules. Specifically, the BIN for the card 110 can be determined from the card number of the card 110. Once determined, a table can be consulted with the BIN to identify a corresponding one of the banks 140 to be selected in order to maintain affinity between the bank issuing the card 110 and the bank selected to process the transaction.

The transaction optimization system 130 can include several modules 150A-150G each including computer program code that when executed by a processor of a computer while loaded into the memory of the memory can achieve transaction optimization during payment processing. In particular, a lowest transaction cost routing module 150A can identify characteristics of the proposed transaction—essentially a transaction profile that can include the type of card, the location of the issuing institution for the card, the amount of the purchase, the type of merchant, whether the card is swiped or the account number key entered in lieu of swiping to name a few. The lowest transaction cost routing module 150 can compute a resulting interchange rate for different ones of the banks 140 according to the transaction profile and can select a particular one of the banks 140 to process the transaction by resulting lowest interchange rate.

By comparison, BIN routing optimization module 150B can select a particular one of the banks 140 to receive the transaction according to a BIN identified for the card 110. Similarly, cash management optimization module 150G can route the transaction to a particular one of the banks 140 according to pre-specified preferential banking relationships. In this regard, if the merchant can determine which transactions are routed to which of the banks 140 based on defined parameters, including; merchant ID, user ID, device type used to process the transaction, product type (Visa, Mastercard, credit card, debit card, etc), entry mode (swiped versus key entered), invoice number or contract, transaction, purchase type, amount (based on a percentage or actual currency), volume and charge backs.

As an example, the merchant can specify all debit card transactions to be routed to one of the banks 140 while all credit card transactions are routed to another of the banks 140. As another example, a merchant with multiple different merchant IDs for different portions of a retail location (e.g. sales, service and parts in an auto dealership) can specify the routing of all charge-backs from one particular merchant ID to one of the banks 140 in order not to affect the pricing of other portions of the retail location. As even yet another example, the merchant can specify that transactions from on-line customers are routed to one of the banks 140 and transactions from in-store customers are routed to another of the banks 140 in as much as transactions from on-line customers are viewed to be riskier and hence are expensive.

Interchange optimization module 150C can determine a card association for the card 110 and subsequently can identify data requisite to achieve a lowest interchange rate for the determined card association. For instance, required data can include an invoice number or tax ID number for a commercial transaction, or requiring the swiping of the card 110 rather than keying the card number at the card processing terminal 120. Subsequently, the merchant can be prompted to provide the required data before the transaction can be routed to the selected one of the banks 140.

Remaining modules include a merchant dashboard module 150D generating a set of reports based on the real time data of transactions and presenting the reports to the merchant in graphical form while also evaluating actual data versus targeted parameters specified by the merchant. Remaining modules further include an instant alert module 150F notifying the merchant with an alert such as an e-mail or text message in the event that a certain threshold has been breached such as an attempt by a clerk to perform an unauthorized transaction or an attempt to process a credit above a specified threshold, or in the event of a number of credits having been processed which surpasses a typical number of credits for a particular period of time, or in the event of a transaction exceeding a specified threshold amount. Finally, an electronic couponing module 150E can be provided through which real-time coupons can be presented graphically in the card processing terminal 120 before routing a transaction and, upon redemption by a customer, the transaction can be modified according to the coupon.

Figure 2:
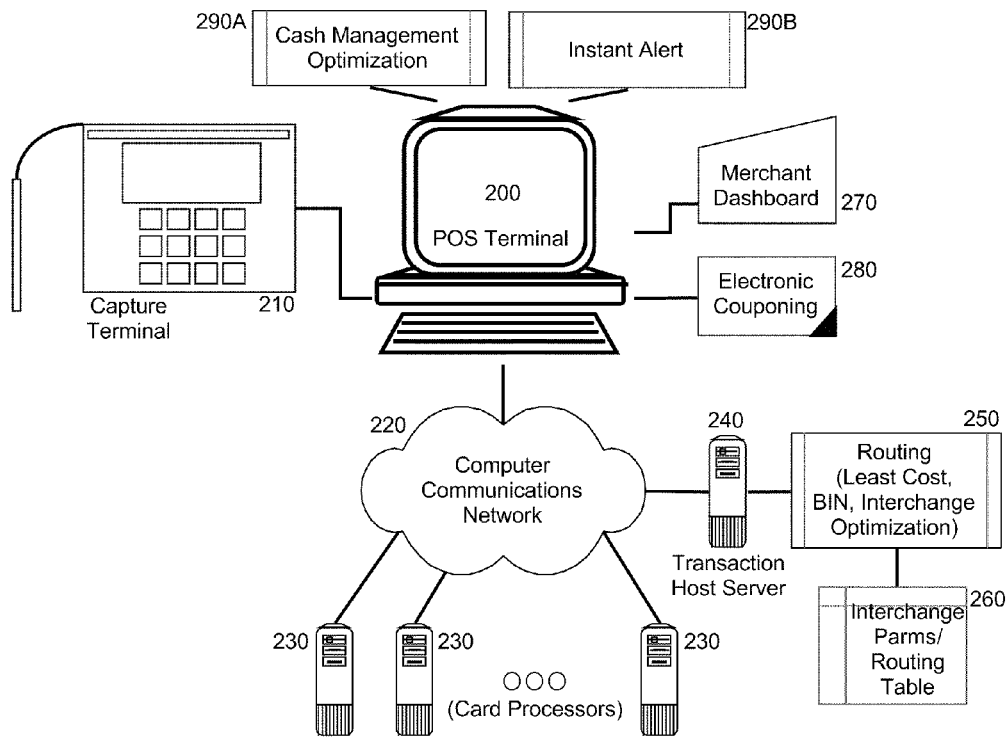
FIG. 2 is a schematic illustration of a payment processing system configured for transaction optimization.

The process described in connection with FIG. 1 can be implemented in a payment processing system. In further illustration, FIG. 2 schematically shows a payment processing system configured for transaction optimization. The system can include a point of sale computer 200 configured with processor and memory coupled to a card processing terminal 210. The point of sale computer 200 can be configured for communicative coupling to different servers 230 for different card processors from over a computer communications network 220. The point of sale computer 200 further can be configured for communicative coupling to a transaction host server 240.

The point of sale computer 200 can host the execution in memory of the cash management optimization module 290A, the instant alert module 290B, the merchant dashboard 270 and also electronic couponing logic 280, though it is to be recognized, that any of the cash management optimization module 290A, the instant alert module 290B, the merchant dashboard 270 can execute in memory of the card processing terminal 210 in the absence of the point of sale computer 200. By comparison, the transaction host server 240 can host the execution in memory of routing module 250 including least cost routing, BIN routing and interchange optimization. The transaction host server 240 further can store an interchange parameters and routing table 260 used to map a card association for a card swiped at the card processing terminal 210 (or key entered at either the card processing terminal 210) with interchange optimization criteria.

In operation, a card can be swiped at the card processing terminal 210 (or the number of the card keyed into to either the card processing terminal 210 or the point of sale computer 200) in consummation of a proposed purchase. A card association can be determined from the number of the card as can the BIN and a transaction profile for the proposed purchase. The card association, number and BIN and transaction profile can be provided to the routing module 250 in response to which the routing module can consult the table 260 to determine required data to achieve an optimum interchange, as well as a selection of a card processor/bank to which the transaction is to be routed according to the BIN and the transaction profile. The determined required data can be communicated to the card processing terminal 210 and/or point of sale computer and one or more prompts can be rendered therein to capture the required data.

Once the required data has been provided, a transaction can be assembled and forwarded to the transaction host server 240. The routing module 250 in turn can route the transaction to a selected one of the card processors/banks 230 according to the routing selected from the routing module 250 responsive to the BIN and transaction profile. Optionally, the routing of the transaction can be directed according to pre-specified rules set forth by cash management optimization module 290A. As an additional option, the instant alert module 290B can generate an alert when called for according to alert rules mapped to events.

Figure 3:
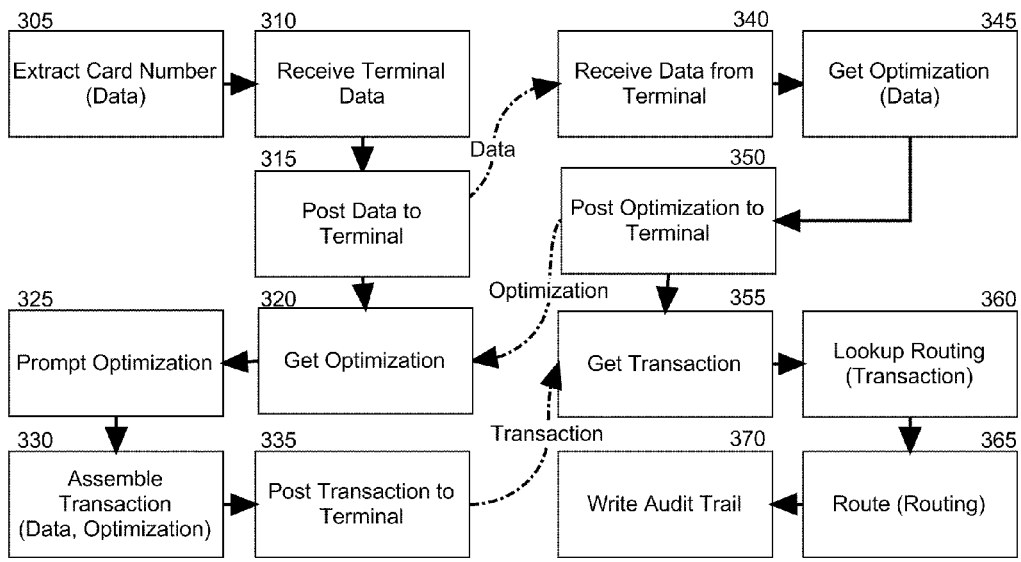
FIG. 3 is a flow chart illustrating a transaction optimization process for payment processing.

In yet further illustration of the overall operation of the payment processing system of FIG. 2, FIG. 3 is a flow chart illustrating a transaction optimization process for payment processing. Beginning in block 305, a card number can be extracted from a card that either has been swiped at a card processing terminal, or keyed into the card processing terminal or a point of sale terminal. In block 310, data can be received from the card processing terminal or the point of sale terminal, such as transaction amount, name of card holder, zip code of the billing address of the card holder, or the identity of a clerk processing the transaction. In block 315, the data can be posted to the transaction host server for processing.

In block 340, the transaction host can receive the data from the terminal and in block 345, optimization criteria can be retrieved for the data. In block 350, the optimization criteria can be returned to the terminal and in block 320, the terminal can receive the optimization criteria, for example data requisite to be provided at the terminal in order to optimize the interchange rate for the transaction. In block 325, the operator of the terminal can be prompted to provide the information included as part of the optimization criteria, such as a personal identification number, an invoice number, a billing zip code, etc. In block 330, a transaction can be assembled with the information received in consequence of the prompt and the data received initially at the terminal. Thereafter, in block 335 the transaction can be posted to the transaction host server.

In block 355, the transaction can be received from the terminal and in block 360, a bank/payment processor to which the transaction is to be routed can be determined, for example to provide a lowest cost of transaction, or to meet a pre-specified preference established by the merchant, or both. In block 365 the transaction can be routed to a selected bank/payment processor. Finally, in block 370, an audit trail can be written for the transaction for use in later reporting.

Figure 4:
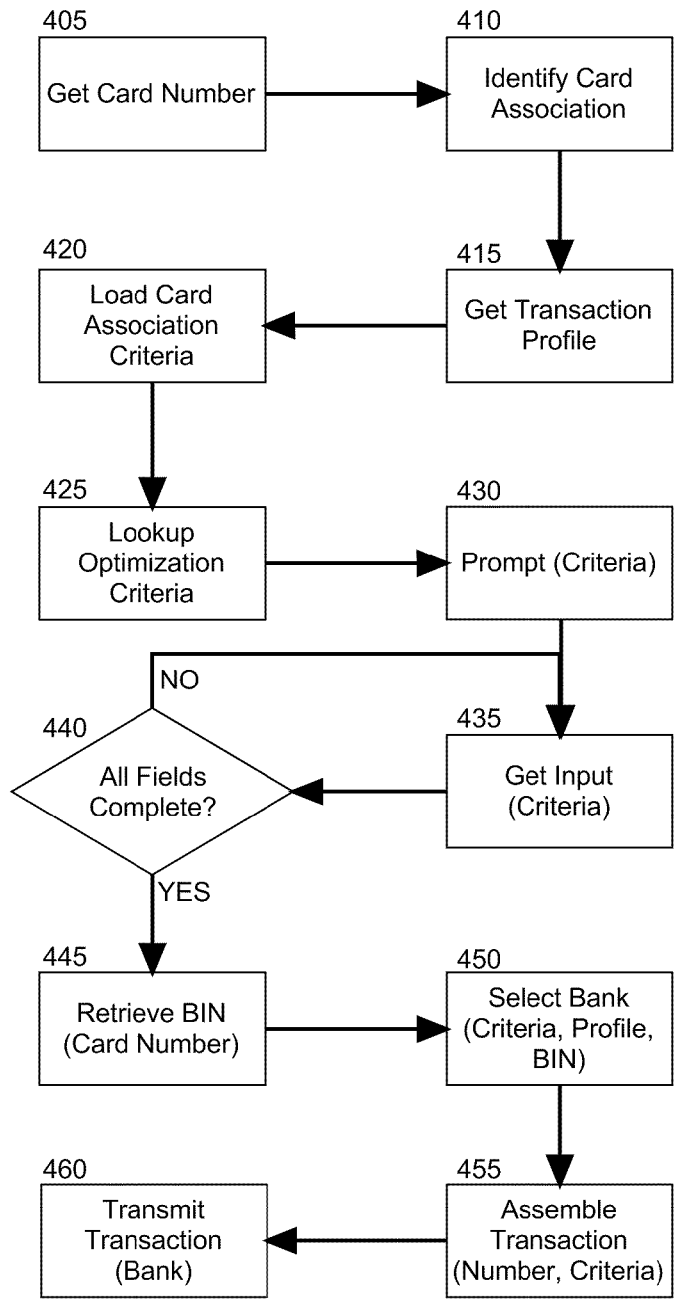
FIG. 4 is a flow chart illustrating a process for transaction optimization.

In even yet further illustration of an aspect of an embodiment of the invention, FIG. 4 is a flow chart illustrating a process for optimized transaction processing. Beginning in block 405, a card number can be acquired for a card during payment processing of a purchase by a purchaser from a merchant through either or both of a card processing terminal or a point of sale terminal. In block 410, a card association can be determined from the card number. Further, in block 415, a transaction profile can be identified for the purchase, such as an amount of a proposed charge, merchandise type, identity of the purchaser, type of merchant, etc. In block 420, optimization criteria can be mapped to the identified card association and in block 425, data requisite to an optimized interchange for the card association can be determined. Thereafter, in block 430, the merchant can be prompted to provide the required data corresponding to the optimization criteria.

In block 435, the required data can be received either through the card processing terminal or the point of sale terminal and in decision block 440, if all data required by the optimization criteria has been provided, in block 445 a BIN can be determined from the card number. Using any combination of the optimization criteria, transaction profile and BIN, in block 450 a particular bank or payment processor can be selected and in block 455, a transaction can be assembled using the required data provided by the merchant as well as the transaction profile. Finally, in block 460 the transaction can be routed to the selected bank or payment processor. In this way, not only can the interchange rate be minimized by compelling the merchant to collect the requisite data for a lowest possible interchange rate, but also the transaction can be routed to a selected bank or payment processor both to minimize the cost of the transaction and also to meet the preference of the merchant.

Figure 5:
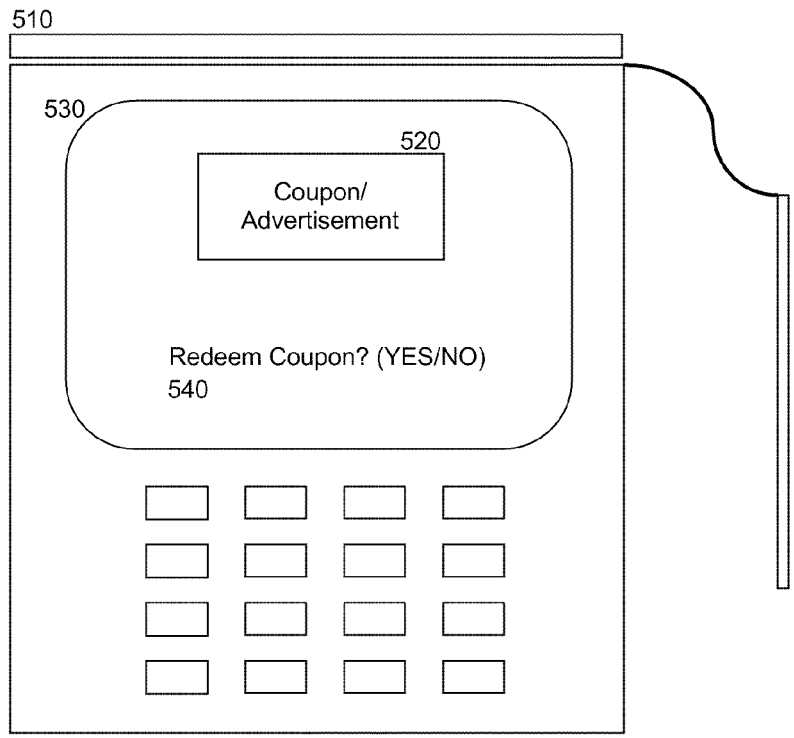
FIG. 5 is a pictorial illustration of a card processing terminal configured for electronic couponing; and, FIG. 6 is a flow chart illustrating a process for electronic couponing in a card processing system.

In one aspect of the embodiment, the card processing terminal can be configured for electronic couponing. In even yet further illustration, FIG. 5 pictorially depicts a card processing terminal configured for electronic couponing. As shown in FIG. 5, a card processing terminal 510 can permit the swiping of a card for payment processing and electronic signature capture (along with transaction profile capture). A display 530 can indicate details of the proposed transaction including a proposed transaction amount, a scanned card number and a name of the card holder. Further, the purchaser can be prompted to provide data through prompts issued in the display 530.

Significantly, depending upon the transaction profile, a coupon or advertisement 520 can be selected for display to the purchaser through the display 530 subsequent to capturing the transaction profile but prior to completing the transaction. Further, a prompt 540 can be presented to the purchaser through the display 530 to redeem the coupon in real-time. If the purchaser elects to redeem the coupon 520, the transaction profile can be modified to reflect the application of the coupon 520 and the modified transaction can be forwarded to the transaction host server for routing to a bank or payment processor for processing.

Figure 6:
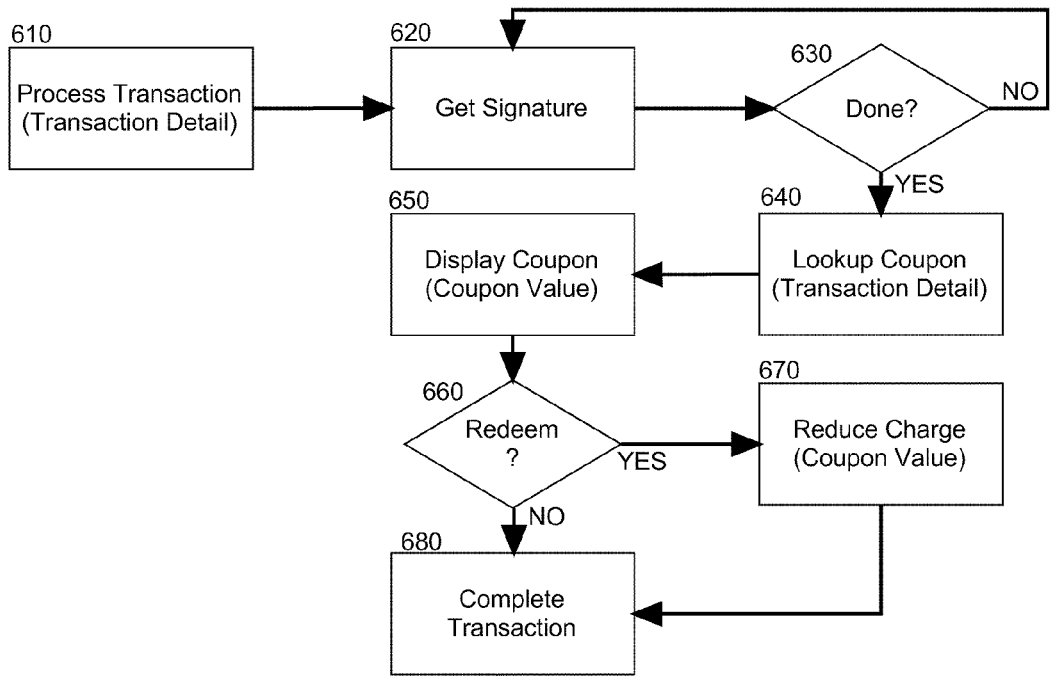

By way of example, FIG. 6 is a flow chart illustrating an exemplary process for electronic couponing in a card processing data processing system. Beginning in block 610, transaction detail can be collected for a proposed transaction at a card processing terminal and processed initially through the transaction host, for example, in order to perform interchange optimization. In block 620, a signature can be captured for the proposed transaction indicating an assent by the purchaser of the transaction detail for the proposed transaction. In decision block 630, once it is determined that the signature has been captured, in block 640, a coupon can be retrieved mapping to one or more aspects of the transaction detail. Subsequently, the coupon can be displayed in the card processing terminal in order to entice the purchaser to redeem the coupon for a specific value. In decision block 660, if the purchaser elects to redeem the coupon, in block 670 the charge reflected in the transaction detail can be reduced accordingly and in block 680 the transaction can be forwarded to the transaction host for final routing to a selected bank or payment processor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A cash management optimization method for payment processing, the method comprising:
    A) receiving a transaction profile for a proposed transaction as payment for a purchase by a purchaser from a merchant at a card processing terminal configured to identify a card number for a card;
    B) comparing the transaction profile to merchant-specified preferences mapping different transaction profiles to different payment processors;
    C) selecting a payment processor for the proposed transaction based upon the comparison of the transaction profile to the merchant-specified preferences; and,
    D) routing the proposed transaction over a computer communications network to the selected payment processor for payment processing, the transaction profile comprises a determination of whether the card is a debit card or a credit card and wherein different payment processors are mapped in the merchant-specified preferences to debit cards and credit cards, respectively, the transaction profile comprises a determination of whether the purchaser is an in-store customer or an online customer and wherein different payment processors are mapped in the merchant-specified preferences to instore customers and online customers, respectively, and the transaction profile further comprises a determination of a merchant identification amongst multiple different merchant identifications for correspondingly different portions of a retail location of the merchant and wherein different payment processors are mapped in the merchant-specified preferences to the different merchant identifications, respectively.

2. A process for transaction optimization during payment processing, comprising the steps of:
    A) swiping or inputting a card at a card processing terminal for payment in satisfaction of a purchase from a merchant by a purchaser processed through coordinate use of said card processing terminal to optimize an interchange rate paid by said merchant in consequence of said payment while meeting preferential criteria for processing payment established by said merchant, said card is a credit card, a debit card, or a stored value card;
    B) executing by a processor of a computer, computer program code that while loaded into memory can achieve transaction optimization during payment processing by selecting a lowest transaction cost routing module, a bank identification number routing optimization module, an interchange optimization module, an electronic couponing module, and/or a cash management optimization module, said lowest transaction cost routing module comprises the steps of:
    C) receiving a transaction profile for a lowest transaction cost routing module proposed transaction as said payment for said purchase by said purchaser from said merchant at said card processing terminal configured to identify a card number for said card;
    D) computing a cost of processing the lowest transaction cost routing module proposed transaction for each of multiple different payment processors based upon the received transaction profile;
    E) selecting one of the different payment processors corresponding to a lowest cost of processing computed for the received transaction profile; and F) routing the lowest transaction cost routing module proposed transaction to the selected one of the different payment processors.

3. The process for transaction optimization during payment processing set forth in claim 2, further characterized in that said transaction profile comprises a geographic location of an issuing bank for the card.

4. The process for transaction optimization during payment processing set forth in claim 3, further characterized in that said transaction profile comprises an amount of the lowest transaction cost routing module proposed transaction.

5. The process for transaction optimization during payment processing set forth in claim 4, further characterized in that said transaction profile comprises a merchant type of the merchant.

6. The process for transaction optimization during payment processing set forth in claim 5, further characterized in that said transaction profile comprises an indication of whether the card had been swiped at the card processing terminal or whether an account number for the card had been keyed into the card processing terminal in lieu of said swiping.

7. The process for transaction optimization during payment processing set forth in claim 6, further characterized in that said bank identification number routing optimization module comprises the steps of:
G) receiving said transaction profile for a bank identification number routing optimization module proposed transaction as said payment for said purchase by said purchaser from said merchant at said card processing terminal configured to identify said card number for said card;
H) extracting a bank identification number from the card number;
I) determining a financial institution pre-specified to be related to the bank identification number; and
J) routing the bank identification number routing optimization module proposed transaction to the determined financial institution related to the bank identification number.

8. The process for transaction optimization during payment processing set forth in claim 7, further characterized in that said interchange optimization module comprises the steps of:
K) receiving said transaction profile for an interchange optimization module proposed transaction as said payment for said purchase by said purchaser from said merchant at said card processing terminal configured to identify said card number for said card;
L) determining a card association for the card number;
M) retrieving criteria for a lowest interchange rate for the card association;
N) prompting the merchant to provide data required by the retrieved criteria;
O) assembling a transaction for the interchange optimization module proposed transaction with the required data; and
P) routing the assembled transaction to a selected payment processor.

9. The process for transaction optimization during payment processing set forth in claim 8, further characterized in that said criteria comprises an indication that the card has been swiped into the card processing terminal and not key entered.

10. The process for transaction optimization during payment processing set forth in claim 9, further characterized in that said criteria comprises an invoice number when the transaction profile indicates a commercial transaction.

11. The process for transaction optimization during payment processing set forth in claim 10, further characterized in that said criteria comprises a tax identification number when the transaction profile indicates a commercial transaction.

12. The process for transaction optimization during payment processing set forth in claim 11, further characterized in that said electronic couponing module comprises the steps of:
Q) receiving said transaction profile for an electronic couponing module proposed transaction as said payment for said purchase by said purchaser from said merchant at said card processing terminal configured to identify said card number for said card;
R) presenting a coupon in the card processing terminal responsive to the transaction profile;
S) prompting the purchaser to redeem the coupon through the card processing terminal;
T) reducing a payment amount for the electronic couponing module proposed transaction if the purchaser redeems the coupon through the card processing terminal; and
U) routing the electronic couponing module proposed transaction to a payment processor for payment processing.

13. The process for transaction optimization during payment processing set forth in claim 12, further characterized in that presenting said coupon in said card processing terminal responsive to said transaction profile comprises the steps of:
V) mapping the transaction profile to a coupon amongst different coupons; and
W) displaying the mapped coupon in a display of the card processing terminal.

14. The process for transaction optimization during payment processing set forth in claim 13, further characterized in that said cash management optimization module comprises the steps of:
X) receiving said transaction profile for a cash management optimization module proposed transaction as said payment for said purchase by said purchaser from said merchant at said card processing terminal configured to identify said card number for said card;
Y) comparing said transaction profile to merchant-specified preferences mapping different transaction profiles to different payment processors;
Z) selecting a payment processor for said cash management optimization module proposed transaction based upon the comparison of said transaction profile to said merchant-specified preferences; and
AA) routing said cash management optimization module proposed transaction over a computer communications network to said selected payment processor for payment processing, said transaction profile comprises a determination of whether said card is a debit card or a credit card and wherein different payment processors are mapped in said merchant-specified preferences to debit cards and credit cards, respectively, said transaction profile comprises a determination of whether the purchaser is an in-store customer or an online customer and wherein different payment processors are mapped in the merchant-specified preferences to instore customers and online customers, respectively.

15. The process for transaction optimization during payment processing set forth in claim 14, wherein the transaction profile comprises a determination of a merchant identification amongst multiple different merchant identifications for correspondingly different portions of a retail location of the merchant and wherein different payment processors are mapped in the merchant-specified preferences to the different merchant identifications, respectively.

* * * * *